May 5, 1964 G. D. CAREY ETAL 3,132,312

MICROWAVE PHASE SHIFTER ADJUSTED BY SIMULTANEOUSLY ALTERING TWO DIMENSIONS SO AS TO KEEP FREQUENCY DEPENDENT PHASE DISPERSION CONSTANT

Filed Oct. 3, 1960 5 Sheets-Sheet 1

INVENTORS
ROBERT E. HOVDA
GERALD D. CAREY
SAM H. WONG

BY Edward A. Sokolski

AGENT

INVENTORS
ROBERT E. HOVDA
GERALD D. CAREY
SAM H. WONG
BY Edward A. Sokolski
AGENT MICROWAVE PHASE SHIFTER ADJUSTED BY SIMULTANEOUSLY ALTERING TWO DIMENSIONS SO AS TO KEEP FREQUENCY DEPENDENT PHASE DISPERSION CONSTANT Filed Oct. 3, 1960 5 Sheets-Sheet 3

INVENTORS
ROBERT E. HOVDA
GERALD D. CAREY
SAM H. WONG
BY Edward A. Sokolski
AGENT INVENTORS
ROBERT E. HOVDA
GERALD D. CAREY
SAM H. WONG
BY Edward A. Sokolski
AGENT

*INVENTORS*
ROBERT E. HOVDA
GERALD D. CAREY
*BY* SAM H. WONG

Edward A. Sokolski
AGENT

United States Patent Office 3,132,312

Patented May 5, 1964

3,132,312

MICROWAVE PHASE SHIFTER ADJUSTED BY SIMULTANEOUSLY ALTERING TWO DIMENSIONS SO AS TO KEEP FREQUENCY DEPENDENT PHASE DISPERSION CONSTANT

Gerald D. Carey, Long Beach, Robert E. Hovda, Buena Park, and Sam H. Wong, Los Angeles, Calif., assignors to North American Aviation, Inc.

Filed Oct. 3, 1960, Ser. No. 59,994
12 Claims. (Cl. 333—31)

This invention relates to a microwave phase shifter and more particularly to a microwave phase shifter for use with a waveguide in which the phase versus frequency characteristics of a microwave channel are maintained constant over a relatively wide frequency band with various phase shift settings.

In microwave equipment, it is sometimes necessary that a phase shift be introduced into a microwave channel and that the variations of phase shift, as the frequency of the signal fed into this channel is changed, be kept constant for all phase shift settings. This problem is particularly significant in monopulse radar systems where the phase relationship between signals received in sum and difference channels is detected to produce an output indicative of the position of objects being detected. Such a radar system is described, for example, in Patent No. 2,933,980, entitled "Integrated Aircraft and Fire Control Autopilot," inventors J. R. Moore et al., issued April 26, 1960. In the radar system described in this patent, sum and difference channels are utilized in resolving the range and bearing information from the target return signals. In such a system, it is imperative that there be no variations in phase differential between the signals from the sum and difference channels with changes in operating frequency and for the various frequencies within the operational frequency spectrum. It is necessary to impose stringent phase tolerances on the microwave circuits to achieve this end result in order to permit the relaxation of the tolerances on the active intermediate frequency circuits in the system to a practical value.

In order to gain maximum sensitivity from the phase detector in a monopulse radar system, the sum and difference signals must be brought into phase with each other. This is accomplished, generally by a waveguide phase shifter placed in the waveguide section associated with the difference channel. In most monopulse radar systems now in use, a waveguide phase shifter utilizing a movable dielectric vane is utilized. Such phase shifters operate satisfactorily at a single frequency or within a narrow band of frequencies. However, the phase versus frequency response of the dielectric vane phase shifter is not constant for all values of dielectric insertion. When the dielectric vane is completely removed from the waveguide, the phase versus frequency characteristics are exactly those of a waveguide itself. When the dielectric is inserted into the waveguide, the slope of the phase shift versus frequency characteristic is noticeably increased. This means that while a desired phase shift can be introduced into the difference channel to satisfy a particular desired phase relationship with the sum channel for a particular operating frequency, if the frequency of the radar transmitter is changed substantially, the original desired phase relationship between the channels will no longer exist. This means that in a variable frequency radar system, the phase shifter would have to be readjusted every time the radar frequency is shifted to insure proper operation of the system.

In order to avoid jamming and interference problems, many radar systems now in use are tunable over a band of frequencies. In such tunable systems, it is necessary that the normally used phase shifter be retuned every time frequency is changed to insure proper monopulse operation. This necessitates a good deal of bulky complicated mechanical and electrical tuning mechanism. Broadband variable phase shifters have been designed which have a constant phase versus frequency response for all phase-shift settings. The available wide-band phase shifters are too large and heavy, however, to be efficiently used in airborne applications, and in general are fairly complex and expensive. In addition, they do not provide an adjustment for the initial slope of the phase versus frequency characteristics.

The device of this invention provides a simple yet effective means for varying phase shift in a microwave channel in such a manner that the phase versus frequency characteristics are maintained constant for all phase-shift settings. In addition, means are provided for initially adjusting the slope of the phase versus frequency curve to compensate for phase dispersion effects in the radar microwave assembly. The initial slope adjustment eliminates the necessity for hand tuning of each individual broad-band monopulse radar system, a procedure that is both costly and time consuming and permits the relaxation of mechanical tolerances on the individual microwave radar components without sacrificing system performance.

The device of this invention accomplishes this end result by providing means for simultaneously varying the effective velocity of travel of the microwave signals in the waveguide and the length of the path over which the signals travel. The effective velocity of wave travel in the waveguide is varied by changing one of the transverse dimensions of the waveguide while the effective length of waveguide path presented to the microwave signals may be varied by either inserting a dielectric vane into the waveguide to various amounts to electrically change the effective waveguide length or by physically changing the length of the waveguide section. Mechanically driven means with appropriate gearing is provided to achieve these end results simultaneously in a predetermined relationship to attain the desired constant phase shift versus frequency characteristic. In this manner, the device of this invention provides a simple yet effective means for accomplishing phase shift in a variable frequency wideband microwave system.

It is therefore an object of this invention to provide an improved microwave phase shifter.

It is still another object of this invention to provide a microwave phase shifter having a constant phase versus frequency response.

It is another object of this invention to provide a microwave phase shifter in which the ratio of the variation of phase with variations in frequency is adjustable.

It is still another object of this invention to provide a simple yet effective phase shifter for use in a variable frequency monopulse radar system.

It is still a further object of this invention to provide a microwave phase shifter in which the effective electrical length of a waveguide section is varied simultaneously with the width of this waveguide section in a predetermined relationship.

Other objects of this invention will become apparent from the following description taken in connection with the accompanying drawings in which FIG. 1 is an exploded perspective view of a first embodiment of the device of the invention;

Figures 1, 2, 3:
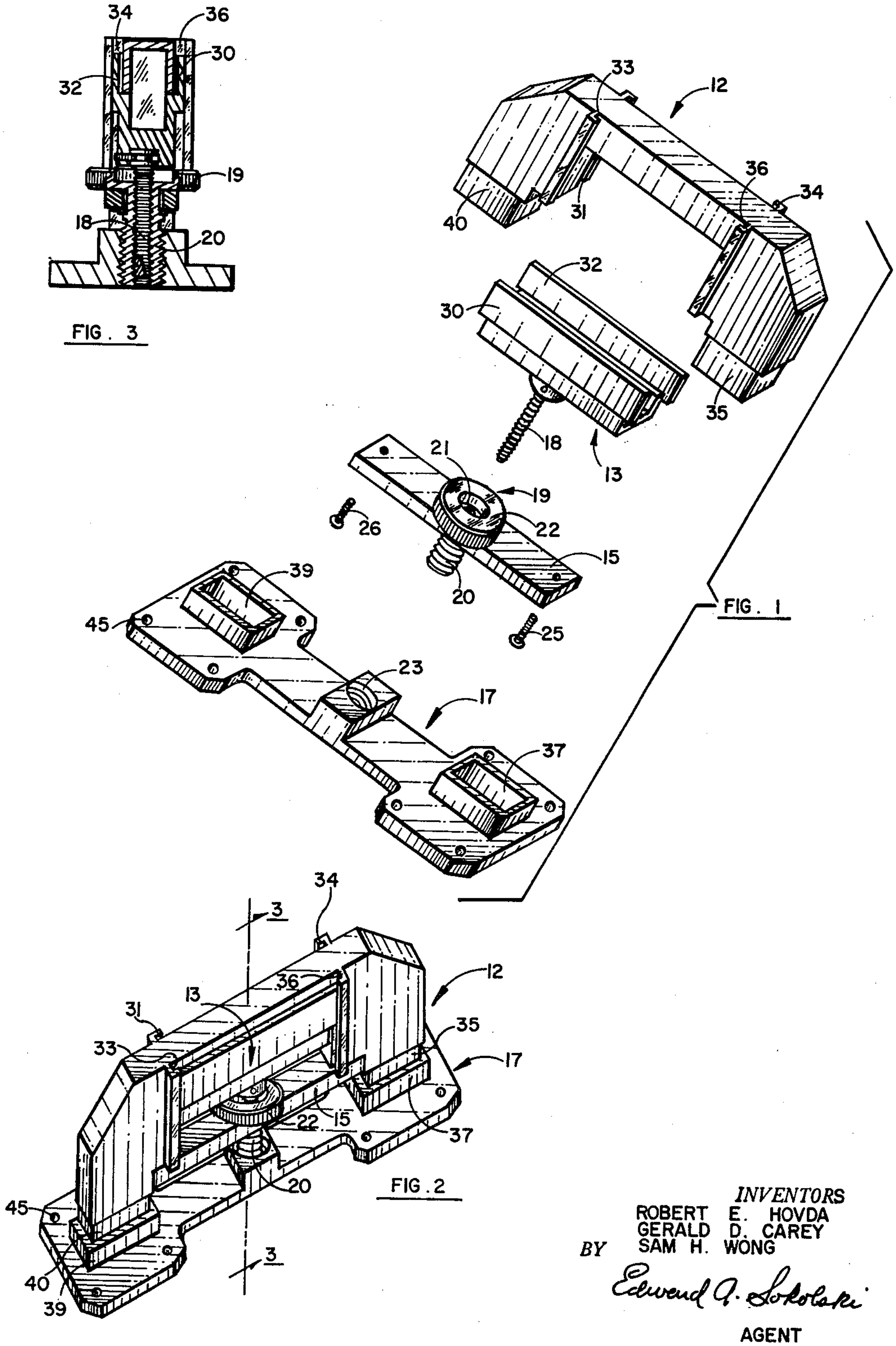
FIG. 2 is a perspective view of the embodiment illustrated in FIG. 1.
FIG. 3 is a cross-sectional view of the embodiment illustrated in FIG. 2 as taken along a plane as indicated by the line 3—3 in FIG. 2.

Referring now to FIGS. 1–3, a first embodiment of the device of the invention in which the physical length and width of a waveguide section is varied simultaneously is illustrated. The phase shifter comprises a base portion 17 having input and output aperture fittings 37 and 39 for coupling the shifter into a waveguide channel. Input and output aperture fittings 37 and 39 may be coupled to the associated waveguide channel in conventional fashion by means of screws (not shown) which may be inserted through apertures 45.

Tuning screw 19 is rotatably mounted on support plate 15. Tuning screw 19 threadably mates with the threaded portion 23 in base 17. Support plate 15 is fixedly attached to waveguide section 12 by means of screws 25 and 26 which are threadably attached to threaded portions (not shown) of waveguide section 12. Waveguide wall section 13 has a pair of opposite waveguide walls 30 and 32 which slidably fit within runners 31, 33, 34, and 36 in waveguide section 12. Screw 18 is fixedly attached to waveguide wall section 13. Screw 18 threadably engages interior threaded portion 21 of tuning screw 19. As the knurled knob 22 of tuning screw 19 is turned, screw 18 which is inserted therein and is fixedly attached to waveguide wall section 13, which is prevented from rotating by the holding action of runners 31, 33, 34, and 36, will be displaced laterally and will effect a similar lateral displacement of waveguide walls 30 and 32 in runners 31, 33, 34, and 36. This will cause an effective widening or narrowing of the waveguide section formed by walls 30 and 32 and the adjacent walls of waveguide section 12. At the same time, the rotation of threaded portion 20 of screw 19 in the mating threaded portion 23 of base portion 17 will effect a translational displacement of base portion 17 relative to waveguide section 12. Recessed portion 35 of waveguide section 12 telescopes into aperture fitting 37 in base portion 17 while recessed portion 40 of waveguide section 12 telescopes into aperture fitting 39 of base portion 17. Relative motion between the telescoping portions with the rotation of screw 19 will effectively lengthen or shorten the total waveguide section between the input and output aperture fittings 37 and 39. In this manner, the length and width of the waveguide section are varied simultaneously.

The motion of waveguide section 12 relative to the base portion 17 and the motion of waveguide walls 30 and 32 relative to waveguide 12 must have a predetermined relationship in order to effect the desired phase shift without changing the slope of the phase versus frequency characteristics. This end result is achieved by designing the thread ratio of screw 18 and screw 19 in accordance with design criteria to be explained further on in the specification.

It will be noted that the initial width of the waveguide as related to its initial length can be adjusted by decoupling screw 18 from the internal threaded portion 21 of screw 19 and adjusting the insertion of screw 18 into tuning screw 19 relative to the insertion of the external threaded portion 20 of screw 19 into threaded portion 23 of base 17. This enables the adjustment of the initial phase versus frequency slope of the device.

Let us now examine the theoretical operation of the embodiment of the device of the invention illustrated in FIGS. 1–3. If the length of the waveguide is increased by an amount $2\Delta l$, the insertion phase length is increased by an amount $$\frac{4\pi\Delta l}{\lambda}$$

where $\lambda$ is the wavelength of the incoming signals. To keep the slope of the phase versus frequency response curve constant over the frequency band of interest, it is necessary to change the length, $\Delta l$, and the width of a portion of the waveguide simultaneously. The phase shift, $\phi$, achieved with such simultaneous variation of the length and width of the waveguide is as follows:

$$\phi=\frac{2\pi(2\Delta l)}{\lambda}\left[1-\left(\frac{\lambda}{2a}\right)^2\right]^{1/2}+\frac{2\pi l}{\lambda}\left[1-\left(\frac{\lambda}{2a'}\right)^2\right]^{1/2} \quad (1)$$

where $\Delta l$=change in waveguide total length $l$=length of variable width section $a$=width dimension of fixed width section $a'$=width dimension of variable width section $a'_i$=initial width of variable width section and, $\lambda$=wavelength of the incoming signals For the initial conditions of $\Delta l=0$ and $a'=a'_i$, the initial phase shift, $\phi_i$, is:

$$\phi_i=\frac{2\pi l}{\lambda}\left[1-\left(\frac{\lambda}{2a'_i}\right)^2\right]^{1/2} \quad (2)$$

The net phase shift for any particular simultaneous change in wavegide length, $\Delta l$, and change in width dimension, $a'-a'_i$, of the variable width section as follows:

$$\phi-\phi_i=\frac{4\pi\Delta l}{\lambda}\left[1-\left(\frac{\lambda}{2a}\right)^2\right]^{1/2}+\frac{2\pi l}{\lambda}\left[1-\left(\frac{\lambda}{2a'}\right)^2\right]^{1/2}-\frac{2\pi l}{\lambda}\left[1-\left(\frac{\lambda}{2a'_i}\right)^2\right]^{1/2}$$
$$=\frac{2\pi}{\lambda}\left\{\Delta l\left[1-\left(\frac{\lambda}{2a}\right)^2\right]^{1/2}+\frac{l\lambda}{2}\left[\left(\frac{1}{a'_i}\right)^2-\left(\frac{1}{a_i}\right)^2\right]^{1/2}\right\} \quad (3)$$

Figure 11:
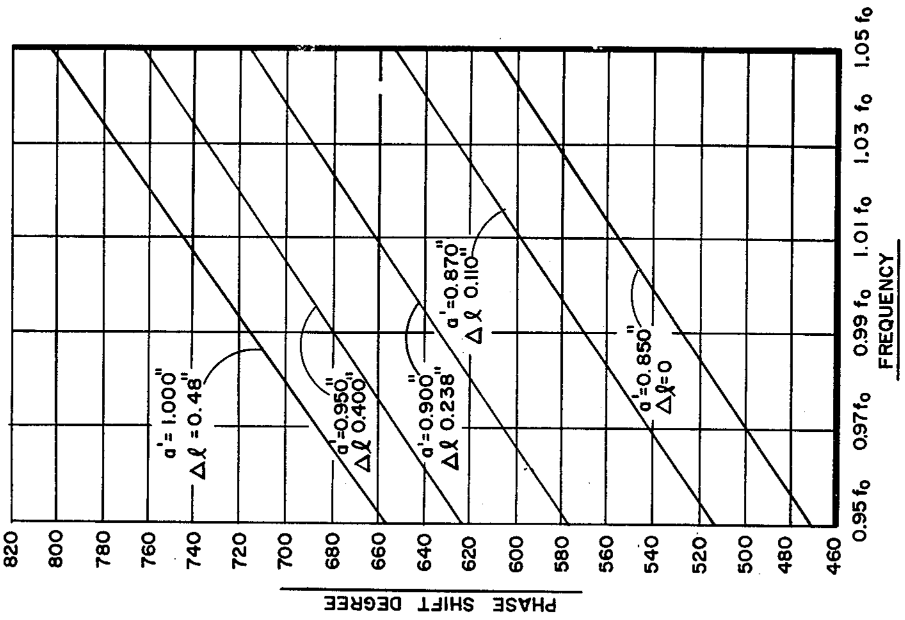
FIG. 11 is a graph illustrating the procedure used in constructing the embodiment of the invention illustrated in FIGS. 1, 2, and 3.

Referring to FIG. 11, a series of graphs of phase shift versus frequency for several values of $\Delta l$ and $a'$ are illustrated. Such a graph can be plotted from Equations 1 and 3 or can be derived experimentally. The actual phase shift effected by the phase shifter can be measured by conventional techniques utilizing a microwave phase bridge. The graphs shown in FIG. 11 were experimentally derived in a waveguide in which the length, $l$, of the variable width section was 3″ and the width "$a$" of the variable length section was .9″. The center frequency, $f_0$, of the input signals was 9,100 megacycles, and the waveguide was operating in the $TE_{01}$ mode. It is to be noted that in the determination of the values of the parameters $\Delta l$ and $a'$ required, a number of values of $\Delta l$ are assumed and then various values of $a'$ are tried for each assumed value of $\Delta l$ until the desired uniform slope characteristics for all assumed values of $\Delta l$ are obtained.

Figure 12:
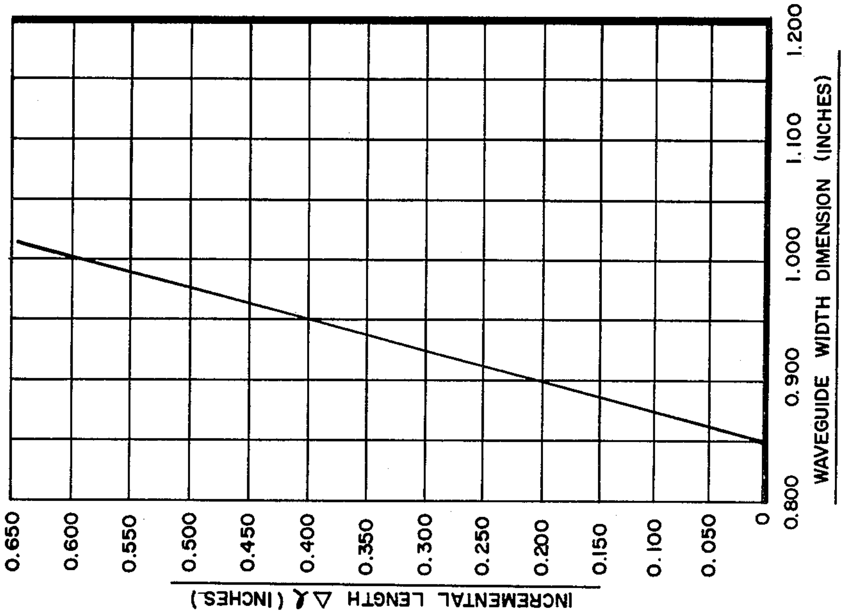
FIG. 12 is a graph illustrating the procedure used in constructing the embodiment of the invention illustrated in FIGS. 1, 2, and 3.

With the formation derived from FIG. 11, a graph may be plotted of the incremental waveguide length, $\Delta l$ versus various values of the waveguide width dimension, $a'$ which will give the same phase versus frequency slope indicative of the same phase variation with changes in frequency. Such a graph as derived from the information of FIG. 11 is shown in FIG. 12. From the information of FIG. 12, the phase shifter illustrated in FIGS. 1–3 can be designed so as to be capable of adjustment to have the indicated corresponding waveguide width dimensions and incremental lengths.

It is to be noted that the desired relationship between the waveguide width dimensions $a'$ and incremental length $\Delta l$ is nearly linear which means that a fixed thread ratio between the threads of screw 18 and the threads of threaded portion 20 of screw 19 can be utilized. As indicated in FIG. 12, a differential screw drive which will vary the overall length at four times the rate of change of the width dimension will achieve the desired end results for this particular design. This end result will be achieved if each of the two telescoping sections, 35 and 40, are displaced relative to base portion 17 at twice the rate the variable width section is displaced. As already noted, the slope of the phase shift versus frequency characteristic is determined by the initial setting of waveguide length relative to waveguide width.

Figure 7:
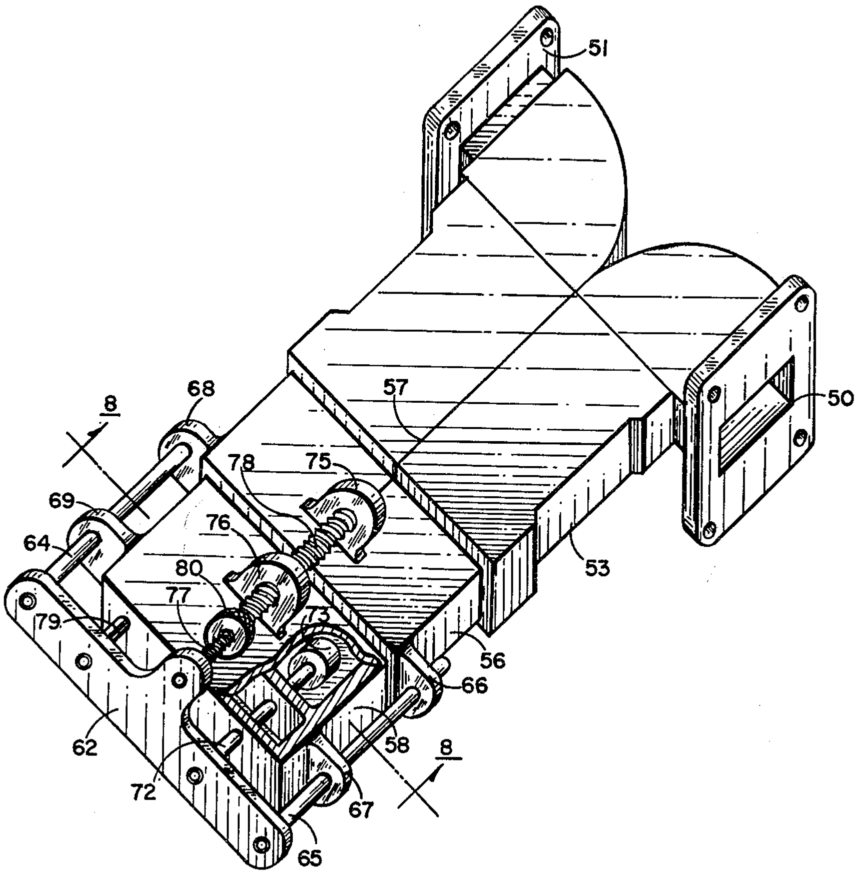
FIG. 7 is a perspective view of a third embodiment of the device of the invention.
Figure 8:
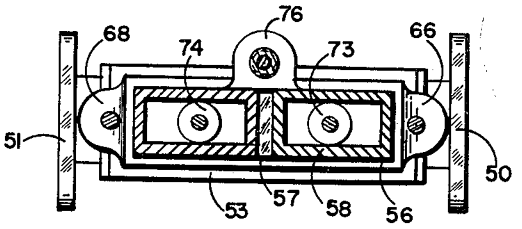
FIG. 8 is a cross-sectional view taken along a plane as represented by the line 8—8 in FIG. 7.

Referring to FIGS. 7 and 8, a second embodiment of the device of the invention is illustrated. In this second embodiment, the effective length of the waveguide is varied by means of a shorting plug while the effective width of the waveguide is changed by telescoping one section of waveguide into another to various amounts. In this manner, the effective width of a greater or lesser portion of the waveguide section is changed from that of the inside diameter of the larger outer waveguide piece to that of the inner telescoping smaller waveguide piece. As illustrated in FIGS. 7 and 8, signals are coupled into and fed out of the waveguide section by means of input aperture fittings 50 and 51. Fixedly attached to the input aperture fittings is a 3-db hybrid coupler 53 which may be a conventional Riblet type directional coupler such as described in Patent No. 2,833,993, issued May 6, 1958, by H. J. Riblet, inventor. The 3-db hybrid coupler, as is well known in the art, is utilized to keep the energy flowing efficiently through the waveguide section in the desired direction.

If we assume that the input signal is fed to input aperture fitting 50 and then through the right-hand portion of directional coupler 53, this energy will then be coupled to the right-hand portion of larger waveguide section 56. It is to be noted that the directional coupler 53 and larger waveguide section 56 each have a septum 57 running down the center and dividing the overall waveguide section formed thereby into two separate equal portions. As indicated in FIG. 8, smaller waveguide section 58 comprises two separate waveguide sections joined together by support member 76. The energy from the right-hand portion of the larger waveguide section 56 is coupled to the right-hand section of the smaller waveguide section 58. By virtue of the intrinsic characteristics of hybrid coupler 53, this energy is coupled to the left-hand section and thence to output aperture fitting 51 through an effective path equal in length to the effective combined lengths of the left and right-hand waveguide sections.

Shorting plugs 73 and 74 are provided respectively in the right and left-hand sections of smaller waveguide section 58. These shorting plugs effectively short out the waveguide section at the point therein at which they are positioned and thus effectively provide means for lengthening and shortening the overall length of the waveguide. Shorting plugs 73 and 74 are fixedly mounted on guide rods 72 and 79, respectively. Guide rods 72 and 79 are fixedly attached to waveguide frame 62 and slidably mounted in the walls of smaller waveguide section 58. A support member 76 is fixedly attached to both sections of smaller waveguide section 58. Threaded rod 78 is rotatably, but not threadably, mounted on support member 75 which is fixedly attached to larger waveguide section 56. Threaded rod 78 threadably engages support member 76. A smaller threaded rod 77 is fixedly attached at one end thereof to waveguide frame 62. The other end of threaded rod 77 is threadably mounted in an interior mating threaded portion (not shown) of threaded rod 78, so that it engages with threaded member 78 and rotates therein. Knurled knob 80 is fixedly attached to threaded member 78. Guide rods 64 and 65 are fixedly attached to waveguide frame 62. Support members 67 and 69 are fixedly attached to waveguide section 58 while support members 66 and 68 are fixedly attached to waveguide section 56. Guide rod 64 is slidably mounted in support members 68 and 69 while guide rod 65 is slidably mounted in support members 66 and 67.

The positioning of waveguide section 58 within waveguide section 56 is controlled by means of knurled knob 80. When knurled knob 80 is rotated, threaded member 78 will rotate on support member 75 which acts as a bearing therefor, and will displace waveguide section 58 relative to waveguide section 56 by virtue of its threadable engagement with support member 76. At the same time, threaded rod 77 will rotatably engage with the interior threaded portion (not shown) of threaded rod 78 to impart lateral motion to waveguide frame 62 relative to waveguide section 58 with rods 64 and 65 slidably moving in support members 68 and 69, and 66 and 67, respectively. This will effect a lateral motion of rods 72 and 79 and their respectively attached tuning plugs 73 and 74 relative to smaller waveguide section 58.

It is to be noted that to achieve the desired end result, the various threads must be arranged so that a rotation of knurled knob 80 will cause motion of tuning plugs 73 and 74 and waveguide section 58 in the same direction. The thread ratio between threaded rods 79 and 78 must be designed to impart a motion of plugs 73 and 74 relative to that of waveguide section 58 so as to achieve with tuned changes in phase shift, the waveguide and length relationship necessary for a uniform phase versus frequency slope over the desired operating frequency range.

The design criteria for the embodiment illustrated in FIGS. 7 and 8 are similar to those for the embodiments illustrated in FIGS. 1–3, and the theoretical explanation of the operation of the embodiment of FIGS. 1–3, as well as the graphs of FIGS. 11 and 12, are equally applicable to this embodiment. The embodiments of FIGS. 7 and 8 and 1–3 operate in the same general manner in that a simultaneous physical variation of effective waveguide length and width are accomplished in a predetermined relationship to achieve the desired phase shift. It is to be noted that the tuning plugs 73 and 74 should be designed so that they do not actually touch the waveguide section 58 to avoid the wear which would result from such physical contact.

Figure 4:
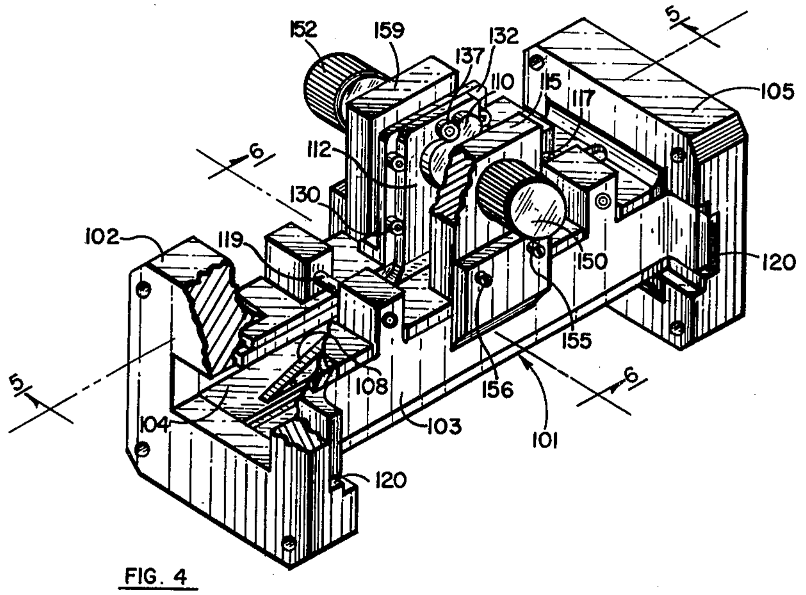
FIG. 4 is a perspective view of a second embodiment of the device of the invention.
Figure 6:
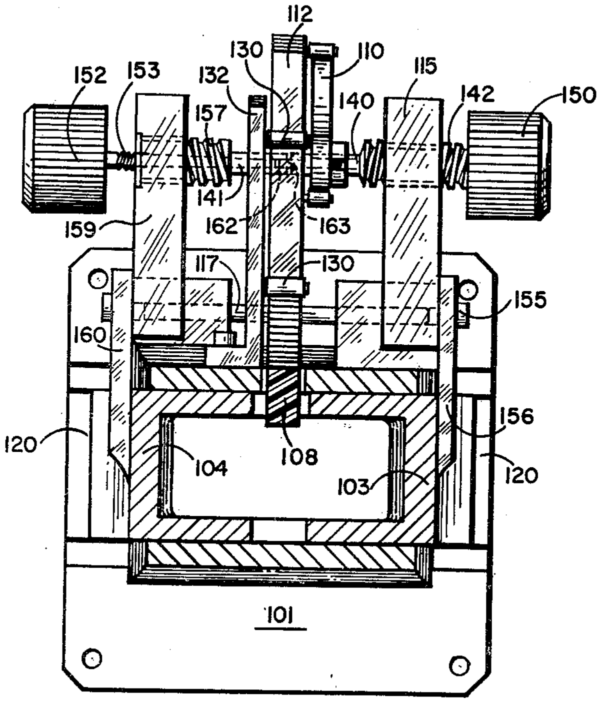
FIG. 6 is a cross-sectional view as taken along a plane represented by a line 6—6 in FIG. 4.
Figure 5:
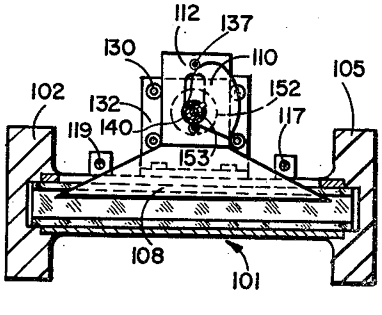
FIG. 5 is a cross-sectional view as taken along a plane represented by the line 5—5 in FIG. 4.

Referring now to FIGS. 4–6, a third embodiment of the invention is illustrated. In this third embodiment, the waveguide width is physically varied but rather than physically varying the length of the waveguide section, an effective length variation is achieved by inserting a dielectric vane within the waveguide section to various depths.

The phase shifter of FIGS. 4–6 has two waveguide half-sections 103 and 104 which are slidably mounted in tracks 120 in the waveguide main frame 101. A vane 108, fabricated of dielectric material, is fixedly attached to support plate 112. Support plate 112 is mounted on rollers 130 which are rotatably mounted on support frame 132. Support frame 132 is fixedly attached to the waveguide main frame 101. Plate 112 is further supported by cam 110 which engages a roller projection 137 which is rotatably mounted on support plate 112.

Cam 110 is fixedly attached to drive rod 140 which is fixedly attached to screw 142. Screw 142 threadably engages support plate 115 which is fixedly attached by means of screws 155 to connecting plate 156. Connecting plate 156 in turn is fixedly attached to waveguide half-section 103. Knurled knob 150 is fixedly attached to screw 142. A second knurled knob 152 is fixedly attached to rod 153.

Knob 152 is utilized to set the initial slope of the phase versus frequency curve by fixing the initial relationship between the waveguide width and the insertion of dielectric vane 108 into the waveguide. This initial slope adjustment is accomplished in the following manner: Drive rod 141 is fixedly attached to screw 157 which threadably engages support plate 159. Support plate 159 is fixedly attached to connecting plate 160 which is fixedly attached to a waveguide half-section 104. Drive rod 141 has a groove 162 in the outer circumference of its end which mates with a tongue 163 in the outer circumference of the end drive rod 140. Drive rod 140 will, therefore, rotatably drive rod 141 when knurled knob 150 is turned.

Drive rods 140 and 141 have hollow interiors which are threaded in the same direction as their associated screws 142 and 157, respectively. Screws 142 and 157 have hollow interior threaded portions similar in their threading to their associated drive rods. Rod 153 which extends through the hollow interior portions of screws 157 and 142 and drive rods 141 and 140, has a right-hand threaded portion which mates with the interior threaded portions of screw 157 and drive rod 141 and a left-hand threaded portion which mates with the interior threaded portions of screw 142 and drive rod 140.

When knurled knob 152 is turned, the oppositely machined threads of rod 153 and the mating interior portions of screw 157 and drive rod 141 and screw 142 and drive rod 140 will force rods 140 and 141 apart without causing rotation of these rods due to the opposite rotational torques imparted thereto. This separation of drive rods 140 and 141 will effect a likewise relative displacement between support plates 115 and 159 which in turn will effect a displacement between waveguide half-sections 103 and 104 through connection plates 156 and 160. This displacement is effected without causing rotation of drive rod 140 or cam 110, thereby enabling the positioning of waveguide half-sections 103 and 104 relative to each other without changing the amount of the insertion of dielectric vane 108 into the waveguide. In this manner, the initial waveguide width relative to effective waveguide length is adjusted to establish the slope of the phase versus frequency characteristic.

When knurled knob 150 is rotated, drive rod 140 drives cam 110 which in turn drives roller projection 137 attached to support plate 112. This effects motion of dielectric vane 108 into and out of the waveguide section comprised by half-sections 103 and 104 in accordance with the shape of cam 110. At the same time, screw 142 threadably rotates in its support plate 115 while screw 157 driven by means of engaging drive rods 140 and 141 threadably rotates in its support plate 159. This effects a lateral displacement between support plates 115 and 159. As the support plates 115 and 159 are fixedly attached to waveguide half-sections 103 and 104, respectively, the waveguide half-sections will be displaced relative to each other in accordance with the support plate displacement. The waveguide half-sections 103 and 104 are slidably mounted on support rods 117 and 119 to enable such relative movement along tracks 120 in the waveguide main frame 101. Knob 150 is thus used to set the desired phase shift. Input and output aperture fittings 102 and 105 are used to couple energy into and out of the phase shifter.

Figure 10:
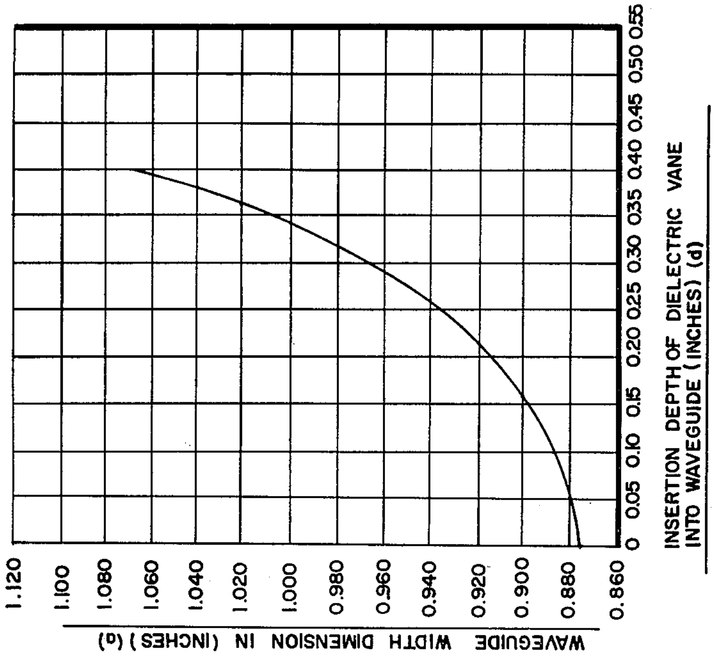
FIG. 10 is a graph illustrating the procedure used in constructing the embodiment of the invention as illustrated in FIG. 4.
Figure 9:
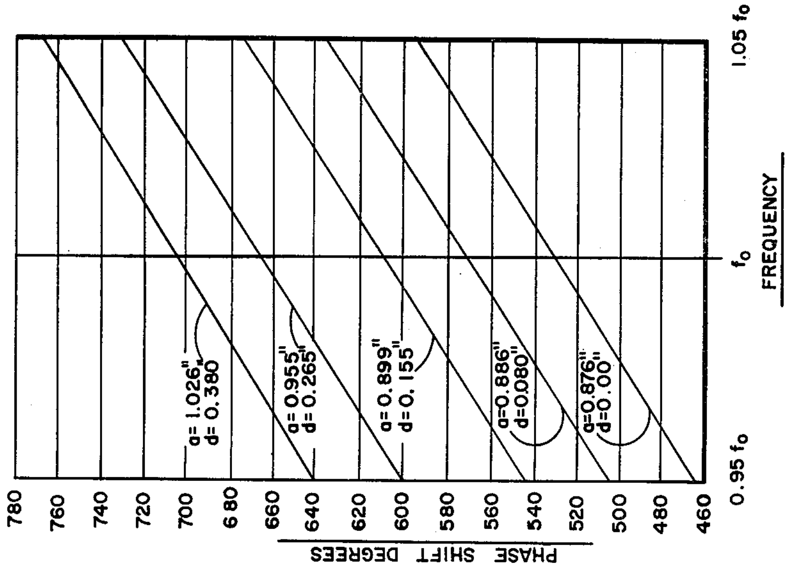
FIG. 9 is a graph illustrating the procedure used in constructing the embodiment illustrated in FIG. 4.

Referring to FIGS. 9 and 10, typical experimentally derived design information for the phase shifter illustrated in FIGS. 4–6 is shown. For this design, the input signal center frequency $f_0$ is 9,000 megacycles. Plots of phase shift in degrees for the frequency band from .95 $f_0$ to 1.05 $f_0$ are shown for various waveguide width dimensions, "*a*" and for various dielectric vane insertions, "*d*." As for the other embodiments, waveguide widths and vane insertions for a given phase shift versus frequency slope are experimentally derived using a microwave phase bridge. From the information derived in FIG. 9, the plot as indicated in FIG. 10 of waveguide width dimension versus insertion depth of the dielectric vane into the waveguide for a constant phase versus frequency slope is plotted. Cam 110 (FIGS. 4–6) is designed in conjunction with the thread characteristics of screw 142 to achieve this desired width versus insertion depth relationship when knob 150 is rotated. As can be seen, in the embodiment of FIGS. 4–6, the waveguide width dimension versus insertion depth of the dielectric vane is not a linear relationship and this necessitates the utilization of a curved cam to achieve the desired end result rather than a pair of threaded members having a predetermined linear thread relationship as utilized for the other embodiments.

The device of this invention thus provides a simple yet effective phase shifter for use in wide-band microwave systems. Means are provided for adjusting the initial slope of the device, thereby compensating for phase dispersion due to imperfections in the microwave channels. Further, in variable frequency systems, the necessity for hand tuning each broadband monopulse radar is eliminated. By allowing for phase dispersion compensation in the adjustment of the initial slope of the phase versus frequency characteristics, the mechanical tolerances of the individual microwave components may be relaxed thereby cutting production costs without sacrificing system performance.

While the invention has been described and illustrated in detail, it is to be clearly understood that the same is by way of illustration and example only and is not to be taken by way of limitation, the spirit and scope of this invention being limited only by the terms of the appended claims.

We claim:

1. A microwave phase shifter comprising a waveguide section; first means for varying the effective width of said waveguide sections; second means for varying the effective length of said waveguide section; and coupling means for interconnecting said first means and said second means in such manner that the differences in phase shift at different frequencies remain constant for each adjustment of said means.

2. The device as recited in claim 1 wherein said means for varying the effective length of said waveguide section may be adjusted independently of said means for varying the effective width of said waveguide section whereby the initial width of said waveguide section relative to the initial length of said waveguide section may be controlled.

3. In a microwave phase shifter for use with a microwave system operative over a relatively broad frequency band, a waveguide section having input and output fittings; first means for physically controlling the width of at least a portion of said waveguide section between said input and output fittings; second means, adjustable independently of said first means, for controlling the effective length of said waveguide section between said input and said output fittings; and coupling means, interconnecting said first and second means, for causing said effective width and said effective length to vary simultaneously in such manner that the differences in phase shift at different frequencies remain constant for each adjustment of said means.

4. The device as recited in claim 3 wherein the effective length of said waveguide section may be initially adjusted without adjusting the width thereof.

5. The device as recited in claim 3 wherein said means for controlling the effective length of said waveguide section comprises a dielectric vane, a pair of similar waveguide half sections comprising said portion of said waveguide section, and drive means for varying the amount of insertion of said dielectric vane into said waveguide section between said waveguide half sections.

6. The device as recited in claim 3 wherein said means for controlling the effective length of said waveguide section comprises a pair of tuning plugs inserted in said waveguide section, first and second waveguide portions, said first waveguide portion being adapted to telescope into said second waveguide portion, and drive means for positioning said tuning plugs within said waveguide section and said first and second waveguide portions relative to each other.

7. A microwave phase shifter comprising a hollow waveguide, said waveguide including first and second oppositely positioned mating sections, each of said mating sections having three walls, two of said walls being parallel to each other, the third of said walls being perpendicular to said first two walls, said first mating section having runners extending parallel to each of said parallel walls, said second mating section being slidably mounted in said runners, said waveguide further including first and second pairs of telescoping pieces, each of said pairs of telescoping pieces comprising a first waveguide portion fixedly attached to a separate end of said first mating section, and a second waveguide portion slidably mounted relative to said first waveguide portion with at least a portion of the walls of said second waveguide portion adjacent to the walls of said first waveguide portion, and means for simultaneously moving said oppositely positioned mating sections relative to each other and said first and second waveguide portions of said telescoping pieces relative to each other in a predetermined relationship.

8. The device as recited in claim 7 wherein said means for simultaneously moving said oppositely positioned mating sections and said first and second waveguide portions comprises a first and second screw having a predetermined thread relationship to each other, said first screw being fixedly attached to said second mating section of said waveguide, a first bar interconnecting said second waveguide portions, a threaded receptacle fixedly attached to the center portion of said bar, and a second bar fixedly attached to said first waveguide portions, said second screw being rotatably mounted on said second bar, said second screw being threadably engaged with said threaded receptacle, said second screw having a threaded hollow portion, said threaded hollow portion being threadably engaged with said first screw, whereby rotation of said second screw effects the desired simultaneous relative motion.

9. A microwave phase shifter comprising input and output aperture fittings, a three db hydrid coupler having similar half sections divided by a septum, said input and output aperture fittings each being connected to a separate one of said coupler half sections, a larger hollow waveguide section having similar half sections divided by a septum, each of said larger waveguide half sections being connected to a separate one of said coupler half sections, a pair of smaller hollow waveguide half sections, each of said smaller waveguide half sections having outside width and length dimensions slightly smaller than the inside width and length dimension of said larger waveguide half sections, each of said smaller waveguide half sections being telescopically mounted within a separate one of said larger waveguide half sections, a tuning plug slidably mounted within each of said smaller waveguide half sections, and means for simultaneously moving said tuning plugs relative to said small waveguide half sections and moving said smaller waveguide half sections relative to said larger waveguide half sections in a predetermined relationship.

10. The device as recited in claim 9 wherein said means for simultaneously moving said tuning plugs and said smaller waveguide half sections comprises a first hollow screw, said first hollow screw having inner and outer threaded portions, said threaded portions having a predetermined thread ratio, a support member having a threaded aperture therein fixedly attached to said larger waveguide section, said first screw outer threaded portion being threadably engaged with said support member, a waveguide frame fixedly connected to said tuning plugs and slidably mounted on said smaller waveguide half sections, and a second screw rotatably mounted on said waveguide frame, said second screw being threadably engaged with the inner threaded portion of said first screw, whereby the desired motion of said tuning plugs and said smaller waveguide half sections is effected by rotating said first screw.

11. A microwave phase shifter comprising a waveguide section; first means for controlling the effective width of said waveguide section; second means for controlling the effective length of said waveguide section independently of said width-controlling means; and differential screw drive means, interconnecting said first and second means, for simultaneously varying the effective width and effective length of said waveguide section in such manner that the differences in phase shift at different frequencies remain constant for each adjustment of said means.

12. In a microwave phase shifter for use with a microwave system operative over a relatively broad frequency band, a waveguide section having input and output fittings, means for simultaneously adjusting the width of at least a portion of said waveguide section and the overall effective length of said waveguide section between said input and output fittings in a predetermined relationship said predetermined relationship being such that the variation of phase shift for input signals over said frequency band is the same for all settings of said adjusting means, said means for simultaneously adjusting the width and length of said waveguide section comprising two pairs of mating waveguide walls, two pairs of waveguide telescoping pieces and drive means for simultaneously varying the relative position between said mating walls and the relative position between said telescoping pieces.

References Cited in the file of this patent

UNITED STATES PATENTS

| | | |
|---|---|---|
| 2,433,368 | Johnson | Dec. 30, 1947 |
| 2,543,425 | Strandberg | Feb. 27, 1951 |
| 2,546,840 | Tyrrell | Mar. 27, 1951 |
| 2,588,103 | Fox | Mar. 4, 1952 |
| 2,602,893 | Ratliff | July 8, 1952 |
| 2,605,413 | Alvarez | July 29, 1952 |
| 2,607,849 | Purcell | Aug. 19, 1952 |
| 2,632,804 | Joguet | Mar. 24, 1953 |
| 2,659,817 | Cutler | Nov. 17, 1953 |
| 2,773,244 | Grieg | Dec. 4, 1956 |
| 2,919,418 | Reis et al. | Dec. 29, 1959 |

UNITED STATES PATENT OFFICE
CERTIFICATE OF CORRECTION

Patent No. 3,132,312 May 5, 1964

Gerald D. Carey et al.

It is hereby certified that error appears in the above numbered patent requiring correction and that the said Letters Patent should read as corrected below.

Column 4, lines 40 to 45, equation (3), the lower right-hand portion of the equation reading:

$$-\left(\frac{1}{a_i}\right)^2\Bigg]^{1/2}\Bigg\} \quad \text{read} \quad -\left(\frac{1}{a'}\right)^2\Bigg]^{1/2}\Bigg\}$$

column 6, line 31, before "and" insert -- width --; line 46, before "wave-" insert -- waveguide walls of --; column 8, line 34, for "sections" read -- section --.

Signed and sealed this 29th day of December 1964.

(SEAL)
Attest:

ERNEST W. SWIDER
Attesting Officer

EDWARD J. BRENNER
Commissioner of Patents